US006648181B2

(12) United States Patent
Whittaker

(10) Patent No.: US 6,648,181 B2
(45) Date of Patent: Nov. 18, 2003

(54) BABY FEEDER AND METHOD

(76) Inventor: Neville G. Whittaker, 5481 NW. 12th St., Lauderhill, FL (US) 33313

( * ) Notice: Subject to any disclaimer, the term of this patent is extended or adjusted under 35 U.S.C. 154(b) by 0 days.

(21) Appl. No.: 09/900,600

(22) Filed: Jul. 9, 2001

(65) Prior Publication Data

US 2003/0006251 A1 Jan. 9, 2003

(51) Int. Cl.[7] .................................................. G01F 11/04
(52) U.S. Cl. .......................................... 222/391; 604/77
(58) Field of Search ................................ 222/326, 327, 222/391; 604/77

(56) References Cited

U.S. PATENT DOCUMENTS 2,617,560 A * 11/1952 Pietrzak ...................... 222/391
2,634,692 A 4/1953 Sherbondy
2,670,881 A 3/1954 Sjoblom
2,698,996 A * 1/1955 Hickerson ................... 222/386
3,161,325 A * 12/1964 Hinkel et al. ............... 222/391
3,273,760 A * 9/1966 Frankenberg ............... 222/386
3,672,052 A * 6/1972 Mason ........................ 30/130
3,727,802 A * 4/1973 Schnurmacher ............. 222/393
4,430,075 A * 2/1984 Urban et al. .................. 604/77
4,994,065 A * 2/1991 Gibbs et al. ................ 222/391
5,372,285 A 12/1994 Harrold et al.
5,375,740 A 12/1994 Umetsu et al.
5,431,680 A * 7/1995 Jones .......................... 604/77
6,026,985 A 2/2000 Elliott, Sr.

FOREIGN PATENT DOCUMENTS

GB 2 076 473 A * 12/1981

* cited by examiner

*Primary Examiner*—Kenneth Bomberg
(74) *Attorney, Agent, or Firm*—Oltman, Flynn & Kubler

(57) ABSTRACT

A feeder for delivering quantities of flowable food into the mouth of a person includes a feeder body having a cylindrical food chamber with a tubular chamber side wall, a chamber distal end wall with a food dispensing port encircled by a distally protruding nipple and a chamber proximal end wall with a chamber rod passing port; a piston slidably mounted within the chamber side wall and a ratchet rod slidably extending through the chamber rod passing port, the ratchet rod having a rod distal end connected to the piston and having a rod proximal end protruding rearwardly from the chamber distal end wall, the ratchet rod having a series of ratchet notches extending longitudinally along one side of the ratchet rod; and a notch engaging ratchet mechanism for advancing the ratchet rod distally.

3 Claims, 3 Drawing Sheets

BABY FEEDER AND METHOD

BACKGROUND OF THE INVENTION

1. Field of the Invention

The present invention relates generally to the field of food dispensing and feeding devices. More specifically the present invention relates to a baby food feeder for delivering measured quantities of flowable food into the mouth of a baby or incapacitated person, the food being either semi-solid or liquid. The feeder includes a feeder body which in turn includes a cylindrical food chamber having a tubular chamber side wall, a chamber proximal end wall with a rod passing port and a chamber distal end wall with a food dispensing port encircle by a distally protruding nipple, and includes a piston slidably and sealingly mounted within the chamber side wall and a ratchet rod slidably extending through the chamber rod passing port, the ratchet rod having a rod distal end connected to the piston and having a rod proximal end protruding rearwardly from the chamber distal end wall, and a series of ratchet notches extending longitudinally along one side of the ratchet rod, a notch engaging ratchet mechanism, and a gripping handle extending radially from the feeder body. A method is also provided, including the steps of placing flowable food into the chamber, placing the nipple into the mouth of a receiving person, and squeezing the trigger to advance the flowable food distally within the chamber so that quantity of the flowable food is discharged into the mouth of the receiving person.

2. Description of the Prior Art

There have long been hand held dispensers for various flowable substances. Sherbondy, U.S. Pat. No. 2,634,692, issued on Apr. 24, 1953, discloses a kitchen utensil in the form of a pastry dispensing device including a tubular member or barrel adapted to contain a quantity of pastry material, a nozzle at one end of the tubular member, and a piston within the tubular member which is movable in steps to eject a desired quantity of the pastry material which is manually operated by moving a trigger.

Sjoblom, U.S. Pat. No. 2,670,881, issued on Mar. 2, 1954, teaches a dispensing device for dispensing batter and the like, including a cylinder for retaining the batter, a piston within the cylinder for driving the batter out of the cylinder through a dispensing port, a ratchet rod extending axially into the cylinder and engaging the piston to drive the piston toward the dispensing port, and ratchet rod driving trigger means. The ratchet rod has two opposing longitudinal series of ratchet engaging notches with mutually different pitches so that it is possible, using one or the other of them and by changing the dispensing port mounted pieces and dies, to vary the shape, size and thickness of batter deposited and thus of the cookies produced.

Elliot, Sr., U.S. Pat. No. 6,026,985, issued on Feb. 22, 2000, reveals a food dispensing gun including a tube holding a quantity of an extrudable food product, a piston sealingly engaged with an interior of the tube, a rod coupled to the piston and an incremental dispenser engaged with the rod and the tube. The incremental dispenser includes a trigger or an advancement lever operable to move the rod in a first direction relative to the incremental dispenser in response to the trigger and a retrograde lock operable to prevent the rod from moving in a second direction, wherein the advancement lever and the retrograde lock are completely enclosed by a housing of the incremental dispenser.

Harrold, et al., U.S. Pat. No. 5,372,285, issued Dec. 13, 1994, discloses a vertical ratchet dispenser of gel-like material with a hinged trigger. Harrold, et al., is stated to include a unique ratcheting arrangement which functions in combination with a hinged trigger and dispenses material through a manifold component. Umetsu, et al., U.S. Pat. No. 5,375,740, issued on Dec. 27, 1994, teaches a manual dispenser for dispensing predetermined amounts of viscous material through actuation of a trigger.

It is thus an object of the present invention to provide a feeder and method which one person can use to dispense measured quantities of flowable food directly into the mouth of another, receiving person with virtually no spillage.

It is another object of the present invention to provide such a feeder which is ergonomically designed to be comfortable to hold and easy to use.

It is still another object of the present invention to provide such a feeder which can be opened and cleaned with minimal effort.

It is finally an object of the present invention to provide such a feeder which is simple, reliable and economical to manufacture.

SUMMARY OF THE INVENTION

The present invention accomplishes the above-stated objectives, as well as others, as may be determined by a fair reading and interpretation of the entire specification.

A feeder is provided for delivering quantities of flowable food into the mouth of a person, including a feeder body having a cylindrical food chamber with a tubular chamber side wall, a chamber distal end wall with a food dispensing port encircled by a distally protruding nipple and a chamber proximal end wall with a chamber rod passing port; a piston slidably mounted within the chamber side wall and a ratchet rod slidably extending through the chamber rod passing port, the ratchet rod having a rod distal end connected to the piston and having a rod proximal end protruding rearwardly from the chamber distal end wall, the ratchet rod having a series of ratchet notches extending longitudinally along one side of the ratchet rod; and a notch engaging ratchet mechanism for advancing the ratchet rod distally.

The feeder preferably additionally includes a gripping handle extending from the feeder body. The feeder body preferably includes a support tube secured to the chamber proximal wall, substantially co-axial with the chamber side wall and extending rearwardly and having a support tube proximal end wall with a proximal feeder body rod passing port through which the ratchet rod extends.

The notch engaging ratchet mechanism preferably includes a pair of carriage guide rails extending rearwardly from the chamber proximal end wall; a ratchet carriage having a carriage rod port slidably mounted around the ratchet rod and having two guide rail ports slidably mounted around the carriage guide rails, the carriage having a notch engaging mechanism and a radially protruding trigger abutment flange; a carriage spring encircling the ratchet rod between the chamber proximal end wall and the carriage biasing the carriage rearwardly; a trigger port in the support tube and a trigger passing through the trigger port and pivotally secured to the support tube, the trigger having a trigger exterior end and a trigger interior end, the trigger exterior end extending radially outward from the support tube, and the trigger interior end abutting the proximal end of the trigger abutment flange; so that squeezing the trigger exterior end rearwardly pivots the trigger interior end forwardly, so that the trigger interior end bears against and slides the carriage abutment flange and the carriage forwardly against biasing of the carriage spring, and the carriage engages one of the notches in the ratchet rod, advancing the ratchet rod, the piston and the baby food forwardly, driving a certain quantity of the food out of the chamber through the food dispensing port and the nipple.

The notches in the ratchet rod preferably each have a radial forward notch segment and a rearwardly sloping rearward notch segment. The gripping handle preferably extends from the support tube.

The feeder preferably additionally includes a pawl structure for engaging the notch in the ratchet rod and thereby preventing the ratchet rod from sliding rearwardly. The pawl structure preferably is positioned adjacent to the proximal feeder body rod passing port inside the support tube, the pawl structure including an L-shaped pawl plate having one plate pawl leg slidably extending toward and biased into contact with the ratchet rod to slide into any registering notch in the ratchet rod, and having another pawl plate leg extending rearwardly through a pawl slot in the chamber proximal end wall to slidably mount the panel plate; and a pawl biasing spring biasing the pawl plate toward the ratchet rod.

The ratchet rod proximal end preferably includes a gripping knob for a user to grip by hand to pull the ratchet rod rearwardly. The ratchet rod preferably is rotatable about its longitudinal axis so that the notches are oriented away from and are no longer engaged by the pawl plate and the carriage, so that the rod may be pulled rearwardly and then the ratchet rod may be rotated so that the pawl plate and carriage once again engage the notches, and subsequently may be ratcheted forward.

The chamber preferably includes a forward chamber portion and a rearward chamber portion which are separable to provide access into the chamber for filling the chamber with food and for cleaning and maintenance of the chamber. The forward chamber portion has forward chamber portion internal threads and the rearward chamber portion has rearward chamber portion external threads, so that the forward chamber portion internal threads screw into the rearward chamber portion external threads. The feeder body, piston and ratchet rod optionally are formed of one of: metal and plastic.

A method is provided of delivering flowable food into the mouth of a receiving person, using the above-described feeder, the method including the steps of placing flowable food into the chamber; placing the nipple into the mouth of the receiving person; and squeezing the trigger to advance the flowable food so that a quantity of the flowable food is discharged into the mouth of the receiving person.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 2:
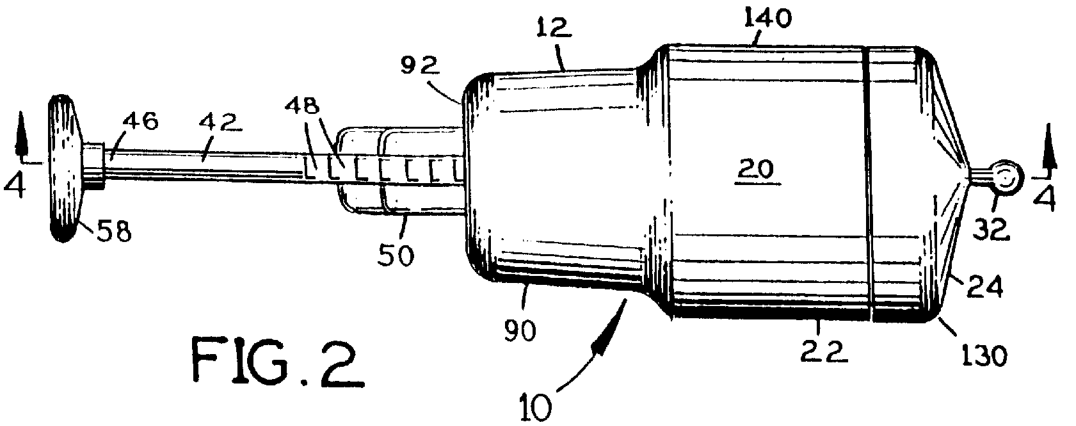
FIG. 2 is a top view of the feeder of FIG. 1.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 1:
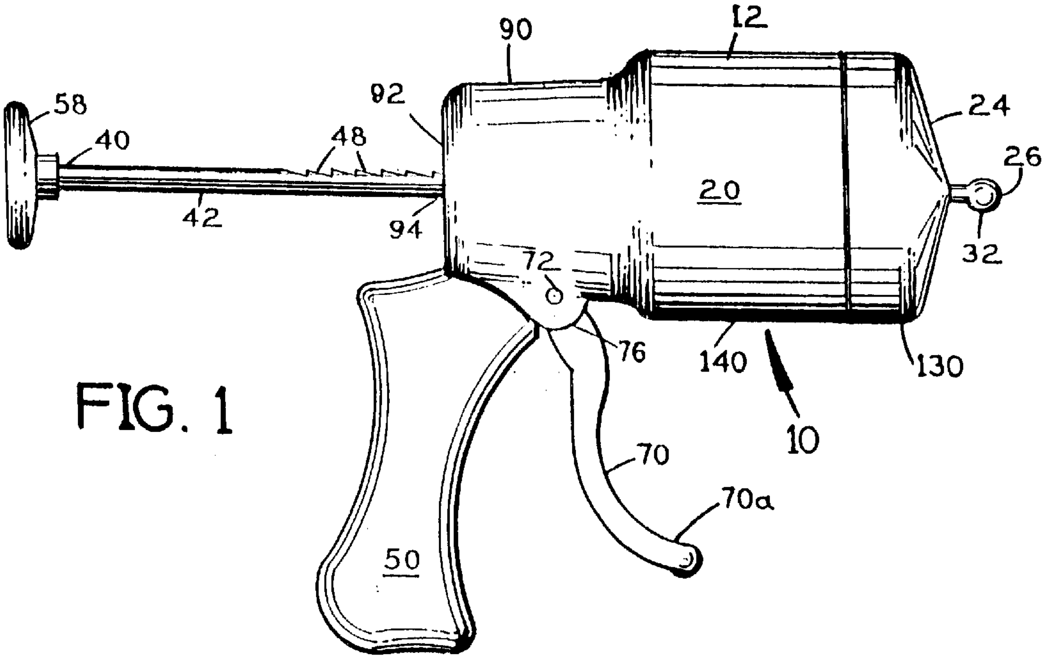
FIG. 1 is a side view of the preferred embodiment of the feeder.
Figure 3:
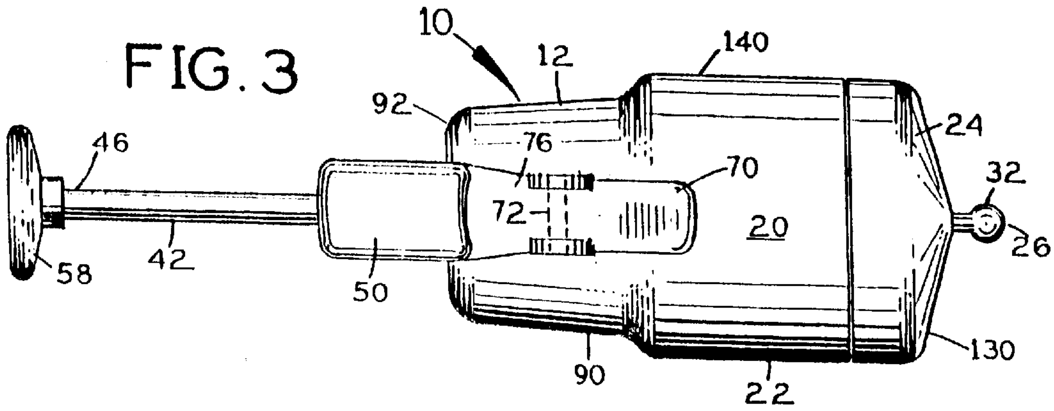
FIG. 3 is bottom view of the feeder of FIG. 1.
Figure 4:
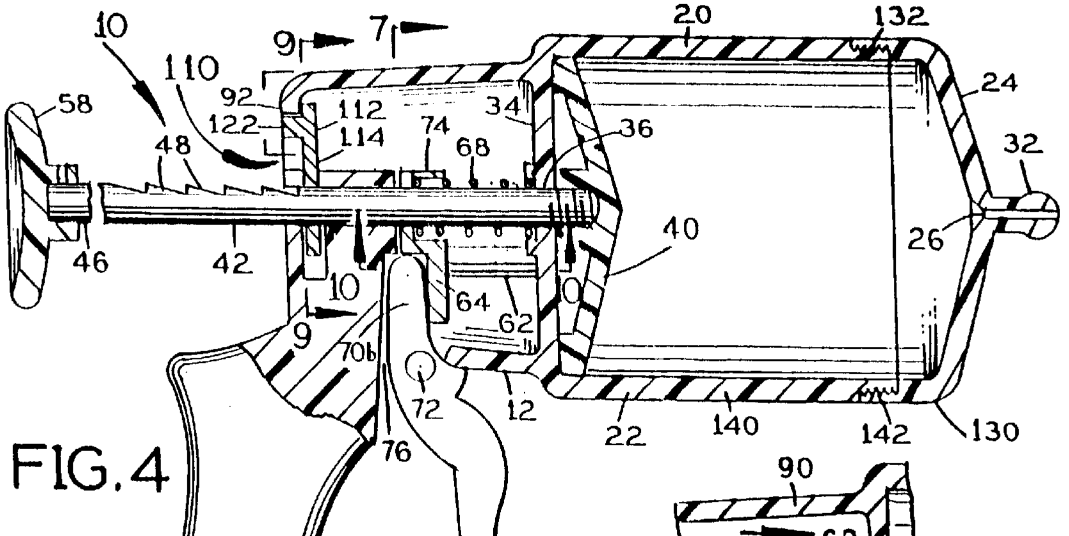
FIG. 4 is a cross-sectional side view of the feeder with the piston retracted proximally, prior to pulling of the trigger.
Figure 10:
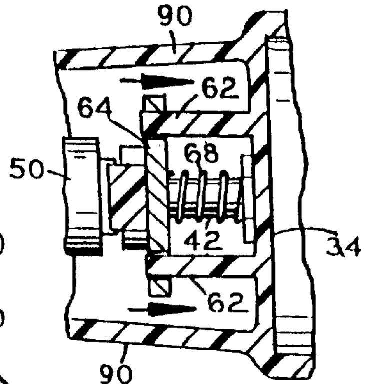
FIG. 10 is a broken away cross-sectional side view of the carriage riding on the guide rails and driving the ratchet rod.
Figure 5:
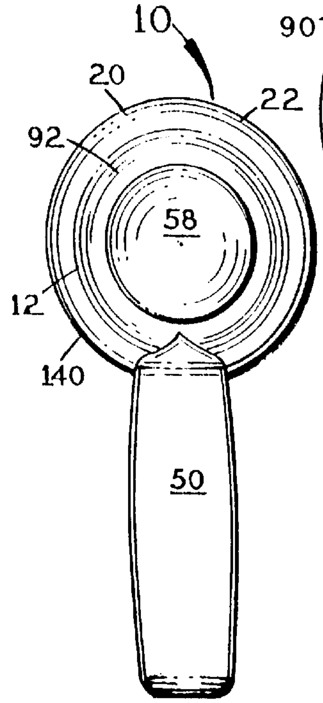
FIG. 5 is a rear view of the feeder of FIG. 1.
Figure 7:
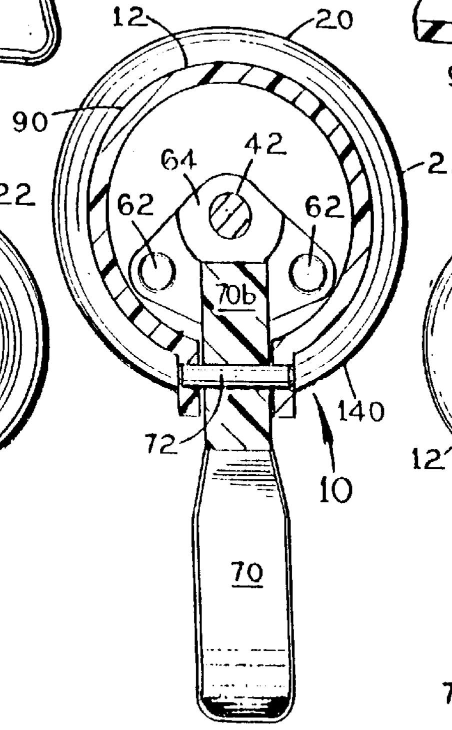
FIG. 7 is a cross-sectional rear view of the feeder of FIG. 1, taken along line 7—7.
Figure 6:
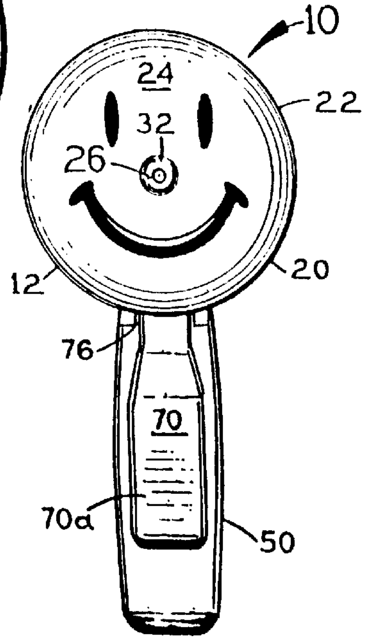
FIG. 6 is a front view of the feeder of FIG. 1, including an optional decorative face.
Figure 8:
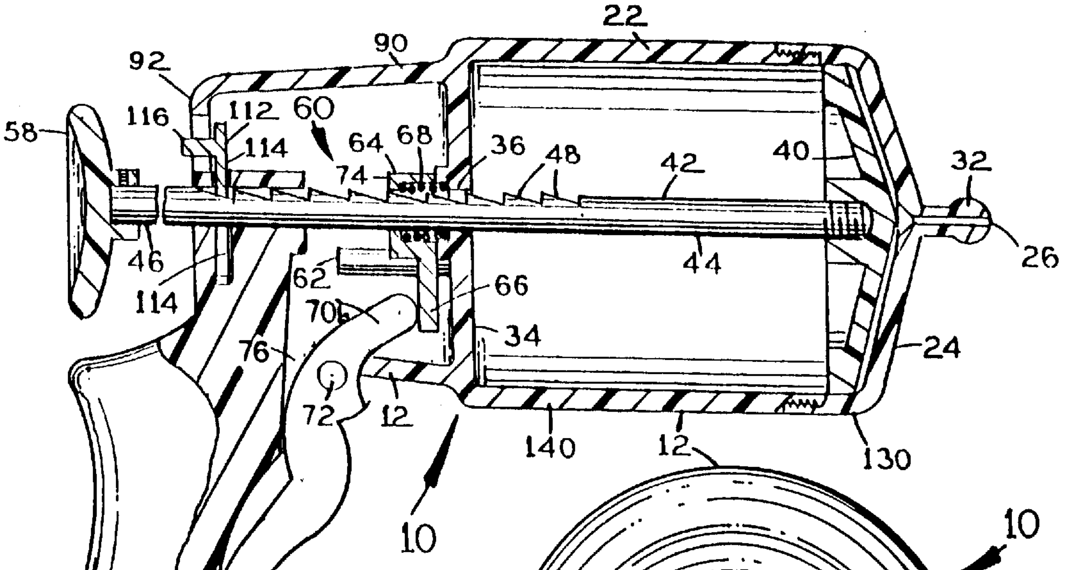
FIG. 8 is a view as in FIG. 4 with the piston advanced distally after the trigger has been pulled.
Figure 9:
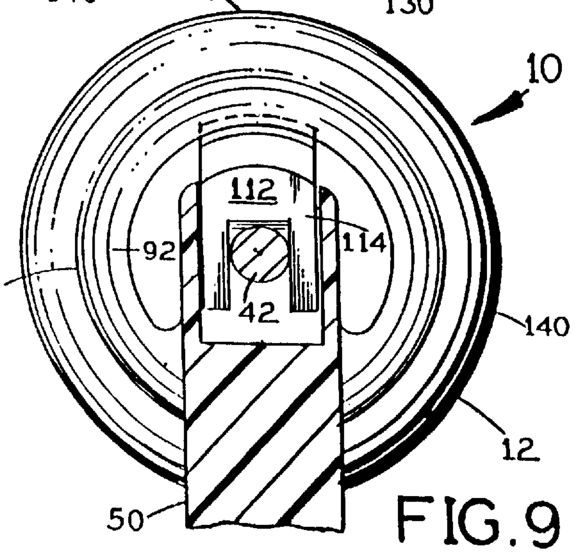
FIG. 9 rear view of the feeder of FIG. 1 with the proximal end of the ratchet rod knob cut away, to reveal the pawl plate and slot.
Figure 11:
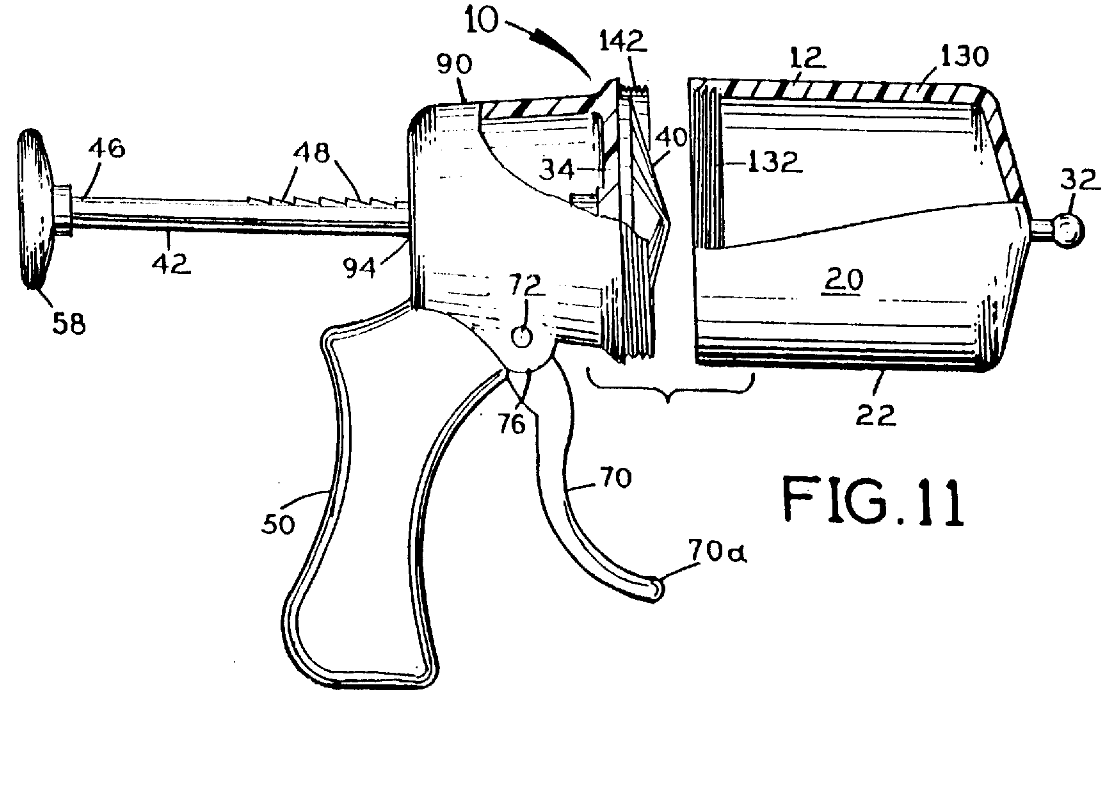
FIG. 11 is a partial cross-sectional side view of the feeder of FIG. 1, showing the cylinder forward and rearward portions separated, revealing their interconnecting threaded segments.

Referring to FIGS. 1–11, a feeder 10 is disclosed for delivering measured quantities of flowable food, such as baby food, whether semi-solid or liquid form into the mouth of a receiving person. Feeder 10 includes a feeder body 12 which in turn includes a cylindrical food chamber 20 having a tubular chamber side wall 22, a chamber distal end wall 24 with a food dispensing port 26 encircled by a distally protruding nipple 32 and having a chamber proximal end wall 34 with a chamber rod passing port 36, and includes a piston slidably mounted and sealingly fitting within the chamber side wall 22 and a ratchet rod 42 slidably extending through the chamber rod passing port 36, the ratchet rod 42 having a rod distal end 44 connected to the piston 40 and a rod proximal end 46, protruding rearwardly from the chamber distal end wall 24 and a series of ratchet notches 48 extending longitudinally along one side of ratchet rod 42, a notch engaging ratchet mechanism 60, and a gripping handle 50 extending from the feeder body 12.

Feeder body 12 preferably includes a support tube 90 secured to chamber proximal end wall 34, co-axial with the chamber side wall 22 and extending rearwardly, having a support tube proximal end wall 92 with a proximal feeder body rod passing port 94. Gripping handle 50 preferably is connected to and extends from support tube 90.

Notches 48 in ratchet rod 42 each have a radial forward notch segment 48*a* and a rearwardly sloping rearward notch segment 48*b*. The notch engaging ratchet mechanism 60 preferably includes a pair of carriage guide rails 62 extending rearwardly from chamber proximal end wall 34, a ratchet carriage 64 having a carriage rod port slidably mounted around the ratchet rod and having two guide rail ports slidably mounted around each of the carriage guide rails 62. Carriage 64 is preferably tubular, opening distally and having an inwardly directed radial end flange 74 at its proximal end for engaging an adjacent notch 48, and having a radially protruding trigger abutment flange 66. See FIG. 8. A carriage spring 68 encircles ratchet rod 42 between the chamber proximal end wall 34 and the carriage 64, extending into the tubular carriage 64 and bearing against the radial end flange 74 to bias carriage 64 rearwardly.

A trigger 70 passes through a trigger port 76 in the support tube 90 and is mounted on a trigger pivot pin 72 secured to support tube 90 at opposing pin 72 ends at either side of the trigger port 72. The trigger exterior end 70*a* extends radially outward from the support tube 90 forwardly of gripping handle 50, and the trigger interior end 70*b* pivots and slides against trigger abutment flange 66, so that gripping and squeezing the trigger exterior end 70*a* rearwardly toward the handle 50 pivots the trigger interior end 70*b* forwardly, bearing against and sliding the carriage abutment flange 66 and carriage 64 forwardly against the biasing of carriage spring 68. As the trigger interior end 70*b* bears against carriage abutment flange 66, it pivots the carriage slightly so that the upper segment of radial end flange 74 pivots downwardly into and engages the adjacent notch 48. The forward, distal movement of carriage 64 thereby carries the ratchet rod 42 forwardly as well, advancing the piston 40 and food forwardly, so that a certain quantity of the food is forced through the food dispensing port 26 and out of the chamber 20 through the nipple 32. Thus with each squeeze of the trigger 70 a discrete pre-measured quantity of food is delivered directly into the mouth of a person having his or her lips around the nipple 32.

Ratchet rod 42 is prevented from sliding rearwardly by a pawl structure 110 located adjacent to the proximal feeder body rod passing port 94 inside support tube 90. The pawl structure 110 preferably includes an L-shaped pawl plate 112 having one plate leg 114 slidably extending toward and biased into contact with ratchet rod 42 to slide into any registering notch 48, and having the other plate leg 116 extending rearwardly through a pawl slot 122 in the chamber proximal end wall 34, the pawl plate 112 being biased toward ratchet rod 42 with a pawl biasing spring 124.

The ratchet rod 42 proximal end preferably includes a gripping knob 58 which the user grips by hand to pull the ratchet rod 42 back after all of the food within chamber 20 has been discharged. First, ratchet rod 42 is rotated so that notches 48 are oriented. away from and are no longer engaged by pawl plate 112, and then the rod 42 is then pulled rearwardly with the assistance of the biasing of carriage spring 68. Carriage spring 68 preferably has sufficient resilience to independently drive ratchet rod 40 and piston 40 rearwardly. Then the rod 42 is rotated so that pawl plate 112 once again engages one of the notches 48 and rod 42 can again be ratcheted forward.

Chamber 20 is formed of forward and rearward chamber portions 130 and 140 which are separable to provide access into chamber 20 for filling chamber 20 with food and for chamber 20 cleaning and maintenance. Forward chamber portion 130 has internal threads 132 which screw into external threads 142 within rearward chamber portion 140.

Chamber 20 may have virtually any cross-sectional shapes, such as square, triangular, elliptical, although circular is preferred. Piston 40 has a corresponding cross-sectional shape.

Method

In practicing the invention, the following method may be used. The method includes the steps of placing flowable food into chamber 20, placing nipple 32 into the mouth of a receiving person, and squeezing trigger exterior end 70*a* rearwardly to advance the flowable food so that a quantity of the flowable food is discharged into the mouth of the receiving person.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A feeder for delivering quantities of flowable food into the mouth of a person, comprising:

a feeder body comprising a cylindrical food chamber for receiving said flowable food having a tubular chamber side wall, a chamber distal end wall with a food dispensing port encircled by a distally protruding nipple and a chamber proximal end wall with a chamber rod passing port;

a piston slidably mounted within said chamber side wall for advancing said food, and a ratchet rod slidably extending through said chamber rod passing port, said ratchet rod having a rod distal end connected to said piston and having a rod proximal end protruding rearwardly from said chamber distal end wall, said ratchet rod having a series of ratchet notches extending longitudinally along the top thereof;

said feeder body also comprising a support tube secured to said chamber proximal end wall substantially co-axial with said chamber side wall and extending rearwardly and having a support tube proximal end wall with a proximal feeder body rod passing port through which said ratchet rod extends;

gripping handle extending down from the feeder body;

and a notch engaging ratchet mechanism for advancing said ratchet rod distally comprising:

a pair of carriage guide rails extending rearwardly from said chamber proximal end wall;

a ratchet carriage having a carriage rod port slidably mounted around said ratchet rod and having two guide rail ports slidably mounted around said carriage guide rails, said carriage having a downwardly projecting end flange above said ratchet rod for engagement in said notches therein and a downwardly projecting trigger abutment flange below said ratchet rod;

a carriage spring encircling said ratchet rod between said chamber proximal end wall and said carriage biasing said carriage rearwardly;

and a trigger port in said support tube and a trigger passing through said trigger port and pivotally secured to said support tube, said trigger having a trigger exterior lower end and a trigger interior upper end, said trigger exterior lower end extending down from said support tube, and said trigger interior upper end abutting the proximal end of said trigger abutment flange from behind;

such that squeezing said trigger exterior lower end rearwardly pivots said trigger interior upper end forwardly, such that said trigger interior upper end bears against and slides said carriage abutment flange and said carriage forwardly against biasing of said carriage spring, and pivots said carriage to move said downwardly projecting end flange thereon into one of said notches in said ratchet rod, advancing said ratchet rod, said piston and said flowable food forwardly, driving a certain quantity of said food out of said chamber through said food dispensing port and said nipple.

2. A feeder for delivering quantities of flowable food into the mouth of a person, comprising:

a feeder body comprising a cylindrical food chamber for receiving said flowable food having a tubular chamber side wall, a chamber distal end wall with a food dispensing port encircled by a distally protruding nipple and a chamber proximal end wall with a chamber rod passing port;

piston slidably mounted within said chamber side wall for advancing said food, and a ratchet rod slidably extending through said chamber rod passing port, said ratchet rod having a rod distal end connected to said piston and having a rod proximal end protruding rearwardly from said chamber distal end wall, said ratchet rod having a series of ratchet notches extending longitudinally along one side of said ratchet rod;

said feeder body also comprising a support tube secured to said chamber proximal end wall substantially co-axial with said chamber side wall and extending rearwardly and having a support tube proximal end wall with a proximal feeder body rod passing port through which said ratchet rod extends;

a gripping handle extending from the feeder body;

a notch engaging ratchet mechanism for advancing said ratchet rod distally comprising:

a pair of carriage guide rails extending rearwardly from said chamber proximal end wall;

a ratchet carriage having a carriage rod port slidably mounted around said ratchet rod and having two guide rail ports slidably mounted around said carriage guide rails, said carriage having notch engaging means and a radially protruding trigger abutment flange;

a carriage spring encircling said ratchet rod between said chamber proximal end wall and said carriage biasing said carriage rearwardly;

and a trigger port in said support tube and a trigger passing through said trigger port and pivotally secured to said support tube, said trigger having a trigger exterior end and a trigger interior end, said trigger exterior end extending radially outward from said support tube, and said trigger interior end abutting the proximal end of said trigger abutment flange;

such that squeezing said trigger exterior end rearwardly pivots said trigger interior end forwardly, such that said trigger interior end bears against and slides said carriage abutment flange and said carriage forwardly against biasing of said carriage spring, and said carriage engages one of said notches in said ratchet rod, advancing said ratchet rod, said piston and said flowable food forwardly, driving a certain quantity of said food out of said chamber through said food dispensing port and said nipple;

and a pawl structure for engaging said notch in said ratchet rod and thereby preventing said ratchet rod from sliding rearwardly, said pawl structure being positioned adjacent to said proximal feeder body rod passing port inside said support tube, said pawl structure comprising:

an L-shaped pawl plate having one pawl plate leg slidably extending toward and biased into contact with said ratchet rod to slide into any registering said notch in said ratchet rod, and having another pawl plate leg extending rearwardly through a pawl slot in said chamber proximal end wall to slidably mount said pawl plate;

and a pawl biasing spring biasing said pawl plate toward said ratchet rod.

3. A feeder according to claim 2, wherein: said ratchet notches are on the top of said ratchet rod, said notch engaging means of said carriage is a downwardly projecting end flange above said ratchet rod for engagement in said notches therein, said trigger abutment flange extends down below said ratchet rod, said trigger exterior end extends down from said support tube, and said trigger interior end abuts the proximal end of the trigger abutment flange from behind.

* * * * *